July 28, 1925.
C. L. JOHNSON
1,547,654
SPARE WHEEL LOCK
Filed April 19, 1923
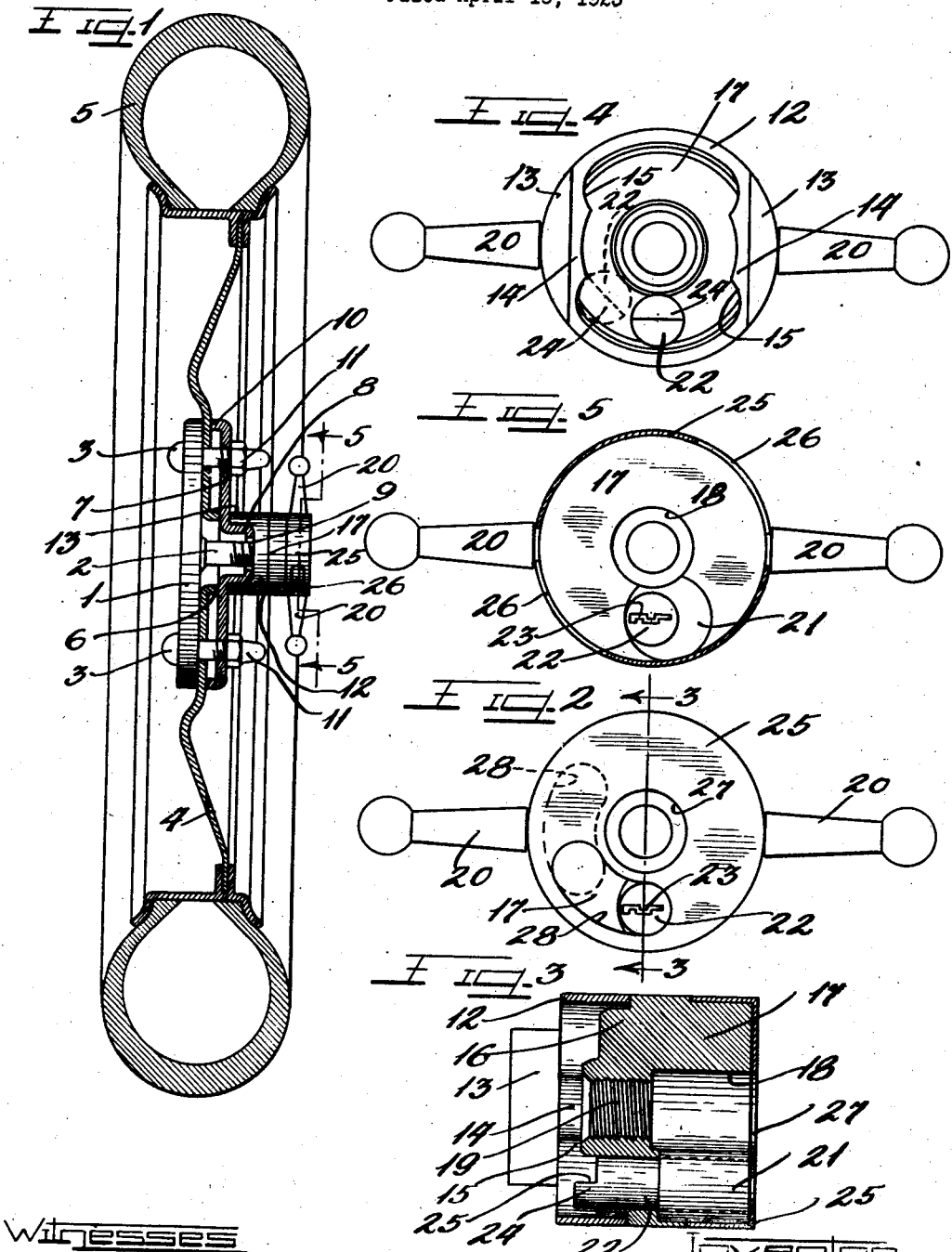

Patented July 28, 1925.

1,547,654

UNITED STATES PATENT OFFICE.

COLVIN L. JOHNSON, OF ST. LOUIS, MISSOURI, ASSIGNOR TO JOHNSON AUTOMOBILE LOCK CO., OF ST. LOUIS, MISSOURI, A CORPORATION OF ILLINOIS.

SPARE-WHEEL LOCK.

Application filed April 19, 1923. Serial No. 633,060.

*To all whom it may concern:*

Be it known that I, COLVIN L. JOHNSON, a citizen of the United States, and a resident of the city of St. Louis, State of Missouri, have invented certain new and useful Improvements in a Spare-Wheel Lock; and I do hereby declare that the following is a full, clear, and exact description of the same, reference being had to the accompanying drawings, and to the numerals of reference marked thereon, which form a part of this specification.

This invention relates to an improved lock for holding a spare vehicle wheel locked on a wheel carrier against unauthorized removal.

It is an object of this invention to provide a lock for use on a bolt of a spare wheel carrier to hold the spare wheel locked in position when a latch member of the lock is set to prevent the lock from being removed from the bolt.

It is also an object of the invention to provide a carrier bolt with a lock adapted to be threaded onto the bolt and locked thereon against removal by operating a key controlled latch member.

It is a further object of the invention to provide a spare wheel lock adapted for use on a carrier bolt and operable by means of a key to cause a rotatable portion of the lock to be locked with a non-rotatable member to prevent the rotatable portion from being removed from the carrier bolt.

It is an important object of this invention to provide a simple and effective lock whereby a spare vehicle wheel may be readily locked upon a carrier by simply substituting the locking members of this invention for the customary carrier bolt nut.

Other and further important objects of this invention will be apparent from the disclosures in the specification and the accompanying drawings.

The invention (in a preferred form) is illustrated in the drawings and hereinafter more fully described.

On the drawings:

Figure 1 is a diametrical section taken through a spare vehicle wheel supported on a carrier and locked in position by means of a lock embodying the principles of this invention.

Figure 2 is a front view of the lock showing the operation of the guard cap in dotted lines.

Figure 3 is a section taken on line 3—3 of Figure 2 with parts in elevation.

Figure 4 is a rear view of the lock showing a locking position of the latch member in dotted lines.

Figure 5 is an enlarged view of the lock taken on line 5—5 of Figure 1.

As shown on the drawings:

The reference numeral 1 indicates a vehicle spare wheel carrier plate having rigidly secured thereon a threaded bolt 2. Supported on the carrier plate 1 are a plurality of bolts 3 which are adapted to engage through the apertures in the disk 4 of a vehicle spare wheel 5. The inner peripheral margin of the wheel disk 4 is bent to form an outwardly projecting flange 6. Engaged on the carrier bolts 3 to the outside of the wheel disk 4 is an apertured retaining plate 7 having integrally formed centrally thereon a squared hub 8. The hub 8 is provided with an opening 9 through which the carrier bolt 2 projects. A flange 10 is formed on the outer periphery of the retaining plate 7 and contacts the wheel disk 4. Cap nuts 11 are threaded onto the projecting ends of the bolts 3 to hold the spare wheel secured in position on the carrier.

To lock the spare wheel on the carrier to prevent stealing thereof, a lock is provided for use on the middle or main carrier bolt 2. The lock comprises a collar or sleeve 12 having integrally formed on one end thereof two diametrically opposite lugs or shoes 13 having straight inner faces adapted to contact opposite faces of the hub 8 of the retaining plate 7. The sleeve 12 is thus held against rotation by means of the lugs 13. Integrally formed on the inner peripheral surface of the sleeve 12 are two oppositely disposed projections or stops 14 having curved end surfaces 15.

Projecting into the outer end of the sleeve 12 is the reduced inner end 16 of a cylindrical lock housing 17. The housing 17 is drilled axially at 18 and is internally threaded at 19 to permit the housing 17 to be threaded onto the carrier bolt 2 by means of two oppositely directed arms or handles 20. The housing 17 is drilled to receive a pin lock 21 having a barrel 22 provided with a key slot 23. The barrel 22 projects through the housing 17 and has one half of the inner projecting end thereof cut away or notched at 25 leaving a locking lug 24 which projects into the plane of the stops 14 of the non-rotatable sleeve 12.

Rotatably engaged on the outer end of the housing 17 is a guard cap or cover 25 having peripheral slots 26 through which the handles 20 project. Rotation of the guard cap 25 on the housing is limited by the length of the slots 26. The guard cap is provided with a middle opening 27 and with a curved slot 28 in the front face thereof. The slot 28 is provided to permit access to the key slot 23 when the guard cap is in the full line position of Figure 2. When the lock is in position and it is desired to cover the key slot 23, the guard cap is rotated on the lock housing 17 to position the slot 28 in the dotted line position of Figure 2, thereby covering up the pin lock 21 to prevent dirt from clogging up the key slot.

After a spare wheel 5 has been mounted upon the carrier and is held in place by the retaining plate 7 and the bolts 3 and nuts 11, the sleeve 12 is placed in position as shown in Figure 1 with the lugs 13 engaged on opposite sides of the retaining plate hub 8 to hold the sleeve against rotation. The lock housing 17 is now threaded upon the main carrier bolt 2 with the latch or locking lug 24 positioned as illustrated in the full line position of Figure 4 so that it will clear the stop 14 in the sleeve 12. After the lock housing 17 has been threaded in place a key is inserted into the key slot 23 and rotated a half turn to rotate the lock barrel 22 to move the lock lug 24 into the position shown in Figure 3. The lock housing 17 is thus locked against rotation on the bolt 2 since the lug 24 will contact one of the curved surfaces 15 of one of the sleeve stops 14 to prevent unthreading of the housing 17 from the bolt. The housing of course when locked can be partially rotated back and forth to the extent of the space between the stops 14.

I am aware that numerous details of construction may be varied through a wide range without departing from the principles of this invention, and I therefore do not purpose limiting the patent granted otherwise than necessitated by the prior art.

I claim as my invention:

1. The combination with a carrier plate, of a retaining plate, bolts on said carrier plate for holding the retaining plate in position, an apertured hub on said retaining plate, a bolt fixed on said carrier plate and projecting through said hub, a sleeve, lugs thereon engaging said hub to hold the sleeve against rotation, stops formed in said sleeve, a lock housing, and a key operated latch member in said housing adapted when in release position to permit the lock housing to be threaded onto said bolt and when in locking position adapted to coact with the sleeve stops to hold said lock housing against rotation on said bolt.

2. The combination with a stationary bolt, of a retaining plate having a squared hub thereon through which said bolt projects, a sleeve, lugs thereon engaging said squared hub to hold the sleeve against rotation, stops formed in said sleeve, a lock housing projecting into said sleeve adapted to be threaded onto said bolt, a latch member in said lock housing, and key operated means for operating said latch member to coact with said sleeve stops to lock the lock housing against rotation on said bolt.

3. The combination with a stationary member having a squared hub thereon, of a bolt projecting through said hub, a sleeve engaging said hub, stops integrally formed in said sleeve, a housing projecting into said sleeve, and a rotatable member in said housing adapted in one position to clear said sleeve stops to permit the housing to be threaded onto said bolt and in another position to engage said stops to hold the housing against being unthreaded from said bolt.

4. The combination with a bolt, of a non-rotatable sleeve engaged over said bolt, stops in said sleeve, a lock housing adapted to be threaded onto said bolt and project into said sleeve, and a key operated latch member in said housing adapted when in release position to permit the lock housing to be threaded onto the bolt or unthreaded therefrom, and when in a latching position adapted to coact with said sleeve stops to hold the lock housing against being threaded onto the bolt or unthreaded therefrom.

5. The combination with a spare wheel carrier and the bolts thereof, of a retaining plate supported on said bolts, nuts engaged on all but one of said carrier bolts to hold the retaining plate and a spare wheel in place, a member engaged with the retaining plate and held against rotation thereby, a housing having a threaded passage therein to permit the housing to be threaded onto said bolt, a key operated pin lock in said housing, a barrel forming a part of said pin lock and projecting from said housing, and stops in said member adapted to be engaged by said barrel when the barrel is in locking position to hold the housing locked against rotation on said bolt.

6. A spare wheel lock comprising a sleeve, lugs thereon adapted to engage a stationary member to hold the sleeve against rotation, stops formed in said sleeve, a housing projecting into said sleeve and rotatable with respect thereto, said housing having a threaded passage therein, handles on said housing to facilitate rotation thereof, a pin lock in said housing, a locking member operated by said pin lock for coaction with said sleeve stops, and a guard on said housing to protect said pin lock.

7. A spare wheel lock comprising a bolt a stationary member, stops formed therein, a housing projecting into said member and rotatable with respect thereto, said housing having a threaded passage therethrough to permit the housing to be threaded onto a bolt, a key operated pin lock in said housing, and a notched locking member projecting from said housing and operable by said pin lock to coact with said stops to hold the housing locked against rotation with respect to said stationary member.

8. A spare wheel lock comprising a threaded bolt a stationary member on said bolt, a member engaged therein rotatable on said bolt, stops in said stationary member, and a key operated latch rotatable in said rotatable member adapted in one position to clear said stops to permit rotation of the rotatable member with respect to said stationary member, said latch when in a latching position coacting with said stops to hold the rotatable member against rotation in said stationary member.

9. A spare wheel lock comprising a member, stops formed therein, lugs on said member, a passaged housing projecting into and rotatable with respect to said member, handles on said housing, a pin lock in said housing having a barrel projecting into said member and adapted to be positioned to clear said stops when the housing is rotated, said pin lock adapted to be operated to position the barrel to contact said stops to permit only partial rotation of the housing with respect to said member, and a slotted guard on said housing through which said handles project, said guard adapted to be adjusted to cover the end of the pin lock to protect the same.

10. A spare wheel lock of the class described comprising a pair of interfitting members, a threaded bolt, one of said members fitting stationary over said bolt, the second of said members rotatably engaged over said bolt, stops on said stationary member, and a key operated notched member in the other of said members adapted to be positioned to either clear said stops or coact therewith.

In testimony whereof I have hereunto subscribed my name in the presence of two subscribing witnesses.

COLVIN L. JOHNSON.

Witnesses:
R. N. WHITE,
J. M. HOFFMANN.